United States Patent
Taschew

(10) Patent No.: US 10,786,898 B2
(45) Date of Patent: Sep. 29, 2020

(54) METHOD FOR THE AUTOMATIC CONFIGURATION OF AN EXTERNAL CONTROL SYSTEM FOR THE OPEN-LOOP AND/OR CLOSED-LOOP CONTROL OF A ROBOT SYSTEM

(71) Applicant: Bayerische Motoren Werke Aktiengesellschaft, Munich (DE)

(72) Inventor: Maxim Taschew, Burgthann (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 312 days.

(21) Appl. No.: 15/830,057

(22) Filed: Dec. 4, 2017

(65) Prior Publication Data

US 2018/0085917 A1 Mar. 29, 2018

Related U.S. Application Data

(63) Continuation of application No. PCT/EP2016/068422, filed on Aug. 2, 2016.

(30) Foreign Application Priority Data

Sep. 29, 2015 (DE) .......................... 10 2015 218 697
Sep. 29, 2015 (DE) .......................... 10 2015 218 699

(51) Int. Cl.
*G06F 17/00* (2019.01)
*B25J 9/16* (2006.01)
(Continued)

(52) U.S. Cl.
CPC ............ *B25J 9/1602* (2013.01); *G05B 17/02* (2013.01); *G05B 19/0426* (2013.01); *G05B 2219/34277* (2013.01)

(58) Field of Classification Search
CPC ............... B25J 9/1602; G05B 19/0426; G05B 2219/34277
(Continued)

(56) References Cited

U.S. PATENT DOCUMENTS 5,015,821 A * 5/1991 Sartorio ................. B25J 9/042
219/124.34
9,486,921 B1 * 11/2016 Straszheim ............ B25J 9/1697
(Continued)

FOREIGN PATENT DOCUMENTS

CN 1935470 A 3/2007
CN 104010774 A 8/2014
(Continued)

OTHER PUBLICATIONS

German-language Search Report issued in counterpart German Application No. 10 2015 218 697.0 dated Jun. 24, 2016 with partial English translation (10 pages).
(Continued)

*Primary Examiner* — Ronnie M Mancho
(74) *Attorney, Agent, or Firm* — Crowell & Moring LLP

(57) ABSTRACT

A method is provided for automatic configuring of an external control system for open-loop and/or closed-loop control of a robot system. In the method, an external control system and a robot system, including at least one manipulator and a robot controller, are provided. In addition, a connection is made for exchanging data between the robot system and the external control system. Description data is transferred from the robot system to the external control system. A mathematical robot model is created by the external control system on the basis of the received description data, and a communication is established between the external control system and the robot controller on the basis of the received description data.

19 Claims, 4 Drawing Sheets

(51) Int. Cl.
*G05B 19/042* (2006.01)
*G05B 17/02* (2006.01)

(58) Field of Classification Search
USPC ................................................ 700/245, 264
See application file for complete search history.

(56) References Cited

U.S. PATENT DOCUMENTS

| | | | |
|---|---|---|---|
| 2007/0032906 A1* | 2/2007 | Sutherland | A61B 34/76 |
| | | | 700/248 |
| 2007/0067678 A1* | 3/2007 | Hosek | G07C 3/00 |
| | | | 714/25 |
| 2007/0208442 A1* | 9/2007 | Perrone | G05D 1/0088 |
| | | | 700/95 |
| 2007/0244599 A1 | 10/2007 | Tsai et al. | |
| 2009/0005886 A1* | 1/2009 | Gao | G05B 5/01 |
| | | | 700/29 |
| 2009/0069942 A1* | 3/2009 | Takahashi | B25J 9/1633 |
| | | | 700/260 |
| 2010/0274385 A1* | 10/2010 | Eriksson | G05B 19/4141 |
| | | | 700/245 |
| 2011/0217923 A1* | 9/2011 | Ma | H02J 50/05 |
| | | | 455/39 |
| 2012/0248082 A1* | 10/2012 | O'Connell | B23K 37/0408 |
| | | | 219/137 R |
| 2012/0265051 A1* | 10/2012 | Fischer | A61B 34/76 |
| | | | 600/411 |
| 2013/0091214 A1* | 4/2013 | Kellerman | G06Q 10/00 |
| | | | 709/204 |
| 2014/0201571 A1* | 7/2014 | Hosek | G06F 11/2257 |
| | | | 714/26 |
| 2014/0277743 A1 | 9/2014 | Hart et al. | |
| 2014/0371905 A1 | 12/2014 | Eberst et al. | |
| 2015/0239121 A1 | 8/2015 | Takeda | |
| 2015/0243035 A1* | 8/2015 | Narasimha | G06T 19/20 |
| | | | 382/154 |
| 2016/0059412 A1* | 3/2016 | Oleynik | B25J 13/02 |
| | | | 700/257 |
| 2016/0078583 A1* | 3/2016 | Nishitani | G06T 1/0014 |
| | | | 700/259 |
| 2016/0096270 A1* | 4/2016 | Ibarz Gabardos | B25J 9/161 |
| | | | 700/253 |
| 2017/0043483 A1* | 2/2017 | Fine | B25J 9/1676 |
| 2017/0106542 A1* | 4/2017 | Wolf | B25J 9/1633 |
| 2018/0029221 A1* | 2/2018 | Tanaka | B25J 15/0433 |
| 2018/0169864 A1* | 6/2018 | Haddadin | G05B 9/03 |

FOREIGN PATENT DOCUMENTS

| | | |
|---|---|---|
| CN | 104049573 A | 9/2014 |
| CN | 104699122 A | 6/2015 |
| CN | 104875203 A | 9/2015 |
| DE | 10 2006 017 945 A1 | 12/2006 |
| DE | 11 2008 003 963 T5 | 6/2011 |
| WO | WO 2010/017835 A1 | 2/2010 |

OTHER PUBLICATIONS

German-language Search Report issued in counterpart German Application No. 10 2015 218 699.7 dated Jun. 24, 2016 with partial English translation (10 pages).
International Search Report (PCT/ISA/210) issued in PCT Application No. PCT/EP2016/068422 dated Oct. 11, 2016 with English translation (5 pages).
German-language Written Opinion (PCT/ISA/237) issued in PCT Application No. PCT/EP2016/068422 dated Oct. 11, 2016 (6 pages).
English translation of Chinese Office Action issued in counterpart Chinese Application No. 201680034468.X dated Sep. 20, 2019 (10 pages).

\* cited by examiner

METHOD FOR THE AUTOMATIC CONFIGURATION OF AN EXTERNAL CONTROL SYSTEM FOR THE OPEN-LOOP AND/OR CLOSED-LOOP CONTROL OF A ROBOT SYSTEM

CROSS REFERENCE TO RELATED APPLICATIONS

This application is a continuation of PCT International Application No. PCT/EP2016/068422, filed Aug. 2, 2016, which claims priority under 35 U.S.C. § 119 from German Patent Applications Nos. 10 2015 218 699.7 and 10 2015 218 697.0, both filed on Sep. 29, 2015, the entire disclosures of which are herein expressly incorporated by reference.

BACKGROUND AND SUMMARY OF THE INVENTION

A method for automatically configuring an external control system for the open-loop and/or closed-loop control of a robot system is provided. The robot system has at least one manipulator and a robot controller.

Robot systems usually consist of a manipulator (robot arm) and a robot controller which is responsible for the programming, open-loop control and closed-loop control of the manipulator. Central parts of this controller are, for example, an application program, interpreters, mathematical functions for path planning and interpolation and frequency converters for controlling the electric motors of the manipulator. The controller normally also contains communication mechanisms in order to communicate with subordinate (for example welding gun controller) and superordinate peripherals (for example PLC cell controller).

The robot controller and the manipulator are nowadays purchased as a complete solution and are highly proprietary systems. For example, the programming and configuration are specific to the manufacturer as far as possible. Therefore, functional restrictions and reduced cross-manufacturer interchangeability are the result, in particular when developing applications.

There are already efforts to place functions of the manufacturer-specific robot controller in external control systems. However, the previously known solutions are merely isolated solutions from the individual robot manufacturers. The available concepts therefore vary depending on the robot manufacturer.

For example, systems for performing teaching and movement commands of the robot via a PLC (programmable logic controller) are known. As a result, both the movement programming and the sequence control of the robot program can be carried out in the PLC. All functions below these, such as path planning and control of peripherals, are still carried out in the robot controller.

Other external control systems make it possible to partially or completely deactivate the path planning of the robot; that is to say axis or tool positions (TCP, "Tool Center Point") of the robot can be predefined or influenced by the external control system. However, the interfaces vary in terms of the concepts and the implementation.

It is also possible to dispense with the controller from the robot manufacturer and to only use the manipulator. In this case, the controller is obtained from a third-party supplier. In addition to the necessary software, this controller comprises the drive controller (frequency converter) for controlling the motors of the robot arm. These systems are used, in particular, for special applications or in system solutions. However, the support from robot manufacturers varies greatly since competition-relevant data must be provided and the robot manufacturer serves only as the supplier of the mechanical system.

The activation of a robot system with an external controller is nowadays a time-consuming and manual process which requires in-depth control and robotics know-how. On the one hand, the correct interface assignment of the interface of the robot controller must be implemented in the external control system. This varies depending on the robot manufacturer and comprises the correct allocation of inputs and outputs or the correct preprocessing and interpretation of message telegrams. This is necessary in order to transmit the correct control commands to the robot controller and to capture and process the current system state of the robot system. Information for controlling the motor is required at the level of the drives: for example voltage, frequency.

On the other hand, a robot model of the manipulator must be created in the external controller in order to correctly perform position specifications. Depending on the depth of integration, the robot model must additionally contain further properties (such as masses, mass inertia) in order to ensure dynamically ideal open-loop control of the manipulator.

In particular, the complicated implementation process on account of the necessary robot know-how and the unclear interface definition or interface variety are a hindrance to being able to flexibly use external control systems. In addition, the support for an external control connection of robot systems varies greatly depending on the robot supplier.

In summary, the disadvantages of the solutions known in the prior art and the associated challenges can be described as follows:

High diversity of components, multiplicity of interfaces, no consistent standard, manual and complicated configuration of the basic controller (bus configuration and drive enable), the external interfaces and the robot model in the external controller, procurement of the respective data relating to the robot mechanical system from the supplier, and concealment of dynamics and drive data by the robot manufacturer—the amount of effort is multiplied with increasing number and variance of manipulators and peripheral components.

An object of at least some embodiments is therefore to provide a method for automatically configuring an external control system which can be used to dispense with a time-consuming and manual process for configuring and controlling a robot.

This object is achieved by means of a method according to embodiments of the invention.

In a method described here for automatically configuring an external control system for the open-loop and/or closed-loop control of a robot system, an external control system and a robot system are provided. The robot system preferably has at least one manipulator and a robot controller. The manipulator preferably has at least one robot arm. This may be a multi-axis robot arm, for example. The robot controller may be responsible, in particular, for the open-loop and/or closed-loop control of the manipulator.

A connection for interchanging data is set up between the robot system and the external control system. For example, the connection for interchanging data may be set up between the robot controller of the robot system and the external control system. The connection may be effected, for example, via a data transfer module using network technology, for example using TCP/IP ("Transmission Control Protocol/Internet Protocol") or using NFC ("Near Field Communication"). It is also possible to call up a further system (for example database, Internet/intranet). Description data are then transmitted from the robot system to the external control system. The description data may be transmitted, for example, from the robot controller of the robot system to the external control system.

A mathematical robot model is created by the external control system on the basis of the received description data. The robot model may be a static and/or dynamic robot model which can be used to correctly calculate the movement of the manipulator and can be used to correctly control the manipulator. The static robot model may comprise, in particular, information relating to the kinematics of the manipulator, for example axis lengths or Denavit-Hartenberg (DH) parameters, in order to be able to calculate forward kinematics and/or inverse kinematics. The dynamic robot model preferably comprises information relating to dynamic parameters, for example axis dimensions, centers of gravity and/or inertia of the manipulator. The mathematical robot model can be created by the external control system in a partially automated or fully automated manner, for example.

Communication between the external control system and the robot controller of the robot system is also set up on the basis of the received description data. The communication may likewise be set up in a partially automated or fully automated manner. The external control system may preferably automatically assume the open-loop and/or closed-loop control sovereignty over the robot system.

The method described here advantageously makes it possible to configure and control the robot system in an automated manner. Furthermore, this makes it possible to dispense with complicated manual implementation of the robot model for the respective manipulator. Integration times can therefore be greatly shortened, thus enabling rapid use of the manipulator best suited to a particular application.

According to another embodiment, the external control system has a further robot controller or consists of a further robot controller. The external control system may be an industrial controller, for example. Furthermore, the external control system may have a computer or may consist of a computer, the computer being able to be a personal computer or a tablet computer, in particular. In addition, the external control system may also include a distributed computer system, for example a so-called cloud.

According to another embodiment, the description data contain basic data relating to the robot system. For example, the description data may contain data relating to the manufacturer of the robot system and/or a visualization. The basic data may contain, for example, information relating to a depth of integration of the robot system.

According to another embodiment, the description data transmitted from the robot system to the external control system contain data relating to the manipulator of the robot system. The data relating to the manipulator may comprise, for instance, information relating to one or more of the following features: kinematics, axes, Denavit-Hartenberg (DH) parameters, masses, mass inertia, centers of gravity, jerking, torques, motor data, static and/or dynamic fiction, gear ratio.

According to another embodiment, the transmitted description data contain information for setting up the communication between the external control system and the robot controller. The description data may include, for example, information relating to one or more of the following features: interface assignment to a movement command specification, signal sequence, interface assignment to a position specification, cycle time, jitter, movement latency, set-up of the message protocol.

According to another embodiment, the description data are semantically described, thus enabling automated processing. The description data are defined, for example, by a formal domain-specific taxonomy and ontology in order to keep the processing data machine-interpretable and processable. This formal data model preferably contains the information needed to integrate the control interface and set up the mathematical robot model.

According to another embodiment, the description data are described in a multi-stage model. In particular, the description data may be described in a multi-stage model in such a manner that it is possible to differentiate the open-loop control of the robot system between at least two of the following levels: application, interpolation and/or drive. The application level may comprise, for example, a specification of movement commands or movement primitives. The interpolation level may comprise, for example, a cyclical specification of Cartesian TCP positions or axis positions. The drive level may comprise, for example, the open-loop and/or closed-loop control of the drive system of the robot system. The description data are particularly preferably described in a multi-stage model in such a manner that it is possible to differentiate the open-loop control of the robot system between the three levels of application, interpolation and drive.

For example, on an uppermost level, the multi-stage model may include information needed to perform movement actions. On a further, middle level, the multi-stage model may comprise information for performing open-loop control functions on a cyclical position level (target specifications). On one or more further, low levels, the multi-stage model may include information for performing closed-loop control functions.

According to another embodiment, the multi-stage model may include two or more levels from the following integration levels: basic information level (integration level 0), application level (integration level 1), interpolation level (integration level 2), drive level (integration level 3).

The basic information level may include, in particular, basic data relating to the robot system, for example details of the manufacturer, serial number, CAD data and/or the integration levels provided. Furthermore, this level may contain data material relating to the bus configuration and/or visualization data relating to the robot system.

The application level may include, for example, usable application commands, for example PTP or LIN movements, necessary parameters and/or the interface assignments for calling the functions.

The interpolation level may be separated, for example, into static interpolation and dynamic interpolation. The static interpolation level may contain, for example, information such as the cycle time of the interpolation or interfaces for controlling the individual axes for the purpose of configuration. Furthermore, kinematic data (Denavit-Hartenberg (DH) parameters, number of axes, axis lengths, type of kinematics) relating to the mechanical system of the manipulator may be included, for example. Details of masses or mass inertias may optionally also be concomitantly provided for ideally dynamic open-loop control. Additionally or alternatively, it is possible to concomitantly provide data required for the dynamically ideal control in the form of an acceleration and/or path planning module. It is therefore at the robot manufacturer's discretion whether it wishes to provide information critical to the competition (masses, center of mass and mass inertia) or concomitantly provides the dynamics data in an encrypted form in a software library.

The drive level may contain, for example, information relating to the gear mechanism, friction and motor in the model.

According to one particularly preferred embodiment, the description data are described in a multi-stage model, the multi-stage model comprising the four levels of basic information level, application level, interpolation level and drive level.

According to another embodiment, the description data are transmitted via a release mechanism. For example, the description data can be transmitted via a license key. This advantageously makes it possible to prevent misuse.

According to another embodiment, the transmitted description data contain a path planning module and/or maximum acceleration values of the manipulator. For example, the description data on the interpolation level may only contain data relating to the path planning module and/or the maximum acceleration values, but may not contain any detailed information relating to masses, centers of mass and/or mass inertias of the manipulator.

As a result of the method described here, robot systems from different manufacturers and manipulators of different geometry can be advantageously easily incorporated into superordinate or external control systems. This is an enabler in order to be able to integrate different robot systems in a production landscape in a highly flexible manner.

A further method for automatically configuring an external control system for the closed-loop and/or open-loop control of a robot system is also specified. In the further method, an external control system and a robot system are provided. The robot system has a manipulator having a drive system. The manipulator preferably has at least one robot arm. This may be a multi-axis robot arm, for example. The drive system may comprise, for example, a drive motor or a plurality of drive motors, in particular for moving the manipulator. The drive motors may be in the form of servo motors, for example. The drive system may optionally have one or more frequency converters for controlling the drive motor(s).

A connection for interchanging data is set up between the robot system and the external control system. For example, the connection for interchanging data may be effected between the robot system and the external control system via a control module which is arranged on the manipulator. Alternatively or additionally, the connection for interchanging data may be set up between a robot controller of the robot system and the external control system. The connection may be effected, for example, via a data transfer module using network technology, for example using TCP/IP ("Transmission Control Protocol/Internet Protocol") or using NFC ("Near Field Communication"). It is also possible to call up a further system (for example database, Internet/intranet). Description data which include information relating to axis parameters of the manipulator are then transmitted from the robot system to the external control system. The description data may be transmitted, for example, from the control module to the external control system. Alternatively or additionally, the description data may be transmitted from the robot controller of the robot system to the external control system.

A mathematical robot model is created by the external control system on the basis of the received description data. The robot model may be a static and/or dynamic robot model which can be used to correctly calculate the movement of the manipulator and can be used to correctly control the manipulator. The static robot model may comprise, in particular, information relating to the kinematics of the manipulator, for example axis lengths or Denavit-Hartenberg (DH) parameters, in order to be able to calculate forward kinematics and/or inverse kinematics. The dynamic robot model preferably comprises information relating to dynamic parameters, for example axis dimensions, centers of gravity and/or inertia of the manipulator. The mathematical robot model can be created by the external control system in a partially automated or fully automated manner, for example.

A communicative and/or electrical connection is also set up between the external control system and the drive system of the manipulator on the basis of the received description data. The communication can likewise be set up in a partially automated or fully automated manner. The external control system can preferably automatically assume the open-loop and/or closed-loop control sovereignty over the robot system or over the manipulator of the robot system.

The further method described here therefore includes, in particular, the following steps of:

providing an external control system and a robot system which has at least one manipulator and a robot controller, setting up a connection for interchanging data between the robot system and the external control system, transmitting description data from the robot system to the external control system, creating a mathematical robot model by means of the external control system on the basis of the received description data, and setting up communication between the external control system and the robot controller on the basis of the received description data.

The further method described here advantageously makes it possible to configure and control the robot system in an automated manner. This also makes it possible to dispense with complicated manual implementation of the robot model for the respective manipulator. Integration times can therefore be greatly shortened, thus enabling rapid use of the manipulator best suited to a particular application.

According to another embodiment, the information relating to the axis parameters of the manipulator contains data relating to lengths, distances and/or rotational angle directions of the manipulator. In addition, the information relating to the axis parameters of the manipulator may comprise data relating to one or more of the following features: Denavit-Hartenberg (DH) parameters, masses, mass inertia, centers of gravity, jerking, torques, motor data, static and/or dynamic friction, gear ratio.

According to another embodiment, the description data contain basic data relating to the robot system. For example, the description data may contain data relating to the manufacturer of the robot system and/or a visualization. The basic data may contain, for example, information relating to a depth of integration of the robot system.

According to another embodiment, the description data contain information for setting up the communicative and/or electrical connection between the external control system and the drive system of the manipulator. For example, the description data may include information relating to one or more of the following features: bus system, encoder and/or resolver.

According to another embodiment, the external control system has one or more frequency converters. The frequency converter(s) may be designed, for example, in such a manner that it/they use(s) an AC voltage to generate an AC voltage, whose frequency and amplitude can be changed, for directly supplying the drive system of the manipulator. Furthermore, the frequency converters may have sensor inputs in order to record state parameters of the drive system of the manipulator. According to this embodiment in which the external control system at least has frequency converters, the drive system may be designed in such a manner that it does not comprise a frequency converter.

According to another embodiment, the robot system has a robot controller with frequency converters. The frequency converters may be part of the drive system of the manipulator, for example. The description data may comprise, for example, information relating to the robot controller. In particular, the description data may include information relating to one or more of the following features: interface assignment to a desired value specification, cycle time, jitter, movement latency, set-up of the message protocol.

According to another embodiment, the external control system has a further robot controller or consists of a further robot controller. The external control system may be an industrial controller, for example. The external control system may also have a computer or may consist of a computer, the computer being able to be a personal computer or a tablet computer, in particular. In addition, the external control system may also include a distributed computer system, for example a so-called cloud.

According to another embodiment, the description data are semantically described, thus enabling automated processing. The description data are defined, for example, by a formal domain-specific taxonomy and ontology in order to keep the processing data machine-interpretable and processable. This formal data model preferably contains the information needed to integrate the control interface and set up the mathematical robot model.

According to another embodiment, the description data are described in a multi-stage model. In particular, the description data may be described in a multi-stage model in such a manner that it is possible to differentiate the open-loop or closed-loop control of the robot system at least between a level of logical drive control and a level of physical drive control.

For example, the model may therefore distinguish, in its description data, which information is needed for a particular depth of integration of the robot system. Information relating to the static and dynamic robot model can therefore be provided separately. Information relating to the bus integration during the logical control of the frequency converters in the robot system can likewise be described in a manner separate from the information relating to the electrical control of the motors in the robot system. The statement of the information for ideal dynamic open-loop control can be concomitantly provided as conventional mechanical system data, for example masses, centers of mass, mass inertias and/or friction. Additionally or alternatively, it is possible to concomitantly provide data required for the dynamic ideal control in the form of an acceleration and/or path planning module. It is therefore at the robot manufacturer's discretion whether it wishes to provide information critical to the competition (masses, center of mass and mass inertia) or concomitantly provides the dynamics data in an encrypted form in a software library.

According to another embodiment, the description data are transmitted via a release mechanism. For example, the description data may be transmitted via a license key. This advantageously makes it possible to prevent misuse.

According to another embodiment, the transmitted description data contain a path planning module and/or maximum acceleration values of the manipulator. For example, the description data on the interpolation level may only contain data relating to the path planning module and/or the maximum acceleration values, but may not contain any detailed information relating to masses, centers of mass and/or mass inertias of the manipulator.

Other objects, advantages and novel features of the present invention will become apparent from the following detailed description of one or more preferred embodiments when considered in conjunction with the accompanying drawings.

DETAILED DESCRIPTION OF THE DRAWINGS

In the exemplary embodiments and figures, identical or identically acting parts may each be provided with the same reference symbols. The illustrated elements and their size ratios with respect to one another should fundamentally not be considered as being true to scale. Rather, individual elements may be illustrated with excessively large dimensions for better representability and/or better understanding.

Figure 1:
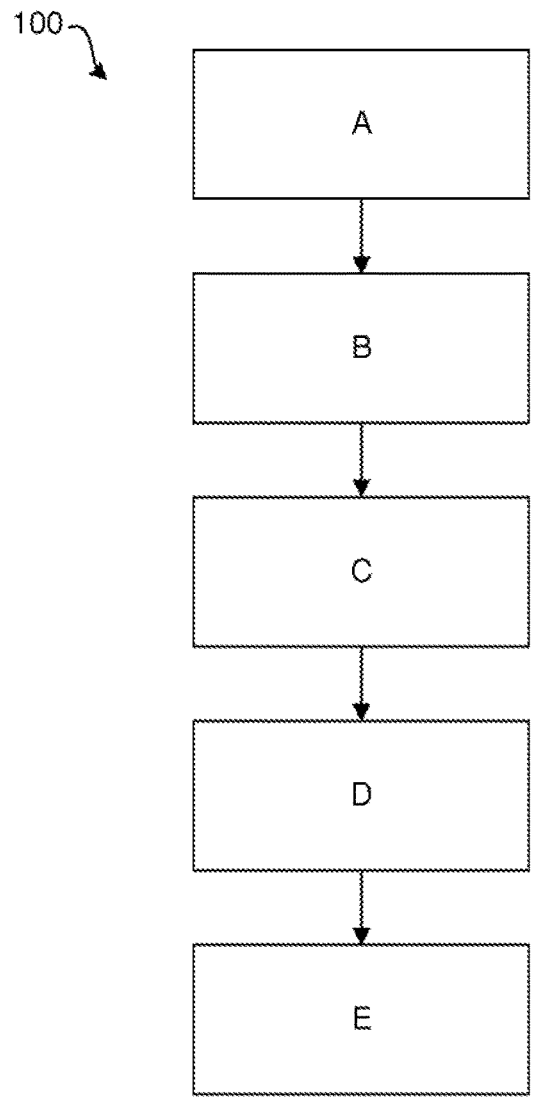
FIG. 1 is a flow chart of a method for automatically configuring an external control system according to one exemplary embodiment.
Figure 2:
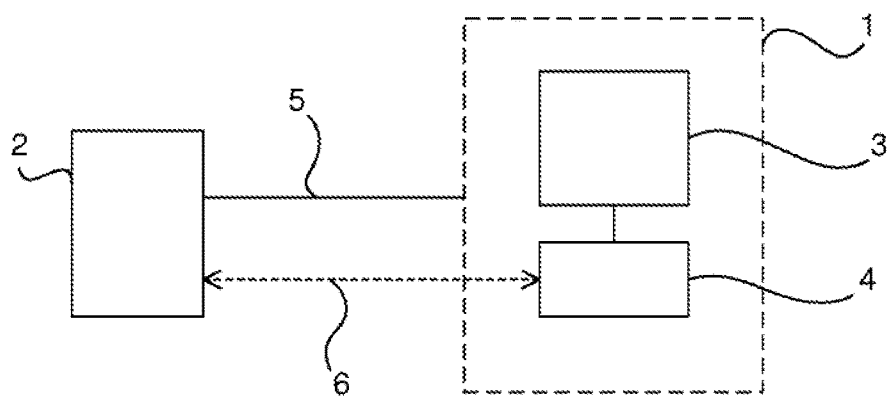
FIG. 2 is a schematic diagram of a system illustrating the method of FIG. 1.

FIGS. 1 and 2 show two different schematic illustrations of a method 100 for automatically configuring an external control system 2 for the open-loop and/or closed-loop control of a robot system 1 according to a first exemplary embodiment. In the method 100, an external control system 2 and a robot system 1, which comprises a manipulator 3 and a robot controller 4, are first of all provided in a first method step A. The external control system 2 may have a further robot controller or may consist of a further robot controller, for example. The external control system 2 may also have a computer and/or may comprise a distributed computer system, in particular a so-called cloud.

In a subsequent method step B, a connection 5 for interchanging data is set up between the robot system 1 and the external control system 2.

After the connection 5 has been set up, description data are transmitted from the robot system 1 to the external control system 2 in method step C. On the basis of the transmitted description data, it is possible for the external control system 2 to automatically carry out the interface configuration and to automatically set up a static and/or dynamic robot model in order to correctly control the manipulator 3.

The description data preferably contain basic data relating to the robot system 1. In particular, the description data may contain information relating to the manufacturer of the robot system 1 and/or a visualization. The basic data relating to the robot system 1 may contain, for example, information relating to a depth of integration of the robot system 1. Additionally or alternatively, the description data transmitted from the robot system 1 to the external control system 2 may contain data relating to the manipulator 3 of the robot system 1. For example, the data relating to the manipulator 3 may contain information relating to the kinematics, the axes, the Denavit-Hartenberg (DH) parameters, the masses, mass inertia, the centers of gravity, the jerking, the torques, the motor data, the static or dynamic friction and/or the gear ratio of the manipulator. The description data may also contain information for setting up the communication 6 between the external control system 2 and the robot controller 4. For example, the description data may contain information relating to the interface assignment to a movement command specification, the signal sequence, the interface assignment to a position specification, the cycle time, the jitter, the movement latency and/or the set-up of the message protocol.

In method step D, a mathematical robot model is created by way of the external control system 2 on the basis of the received description data. The mathematical robot model is preferably created by the external control system 2 in a partially automated or fully automated manner.

In method step E, communication 6 is set up between the external control system 2 and the robot controller 4 on the basis of the received description data. The communication 6 is preferably likewise set up in a partially automated or fully automated manner.

Figure 3:
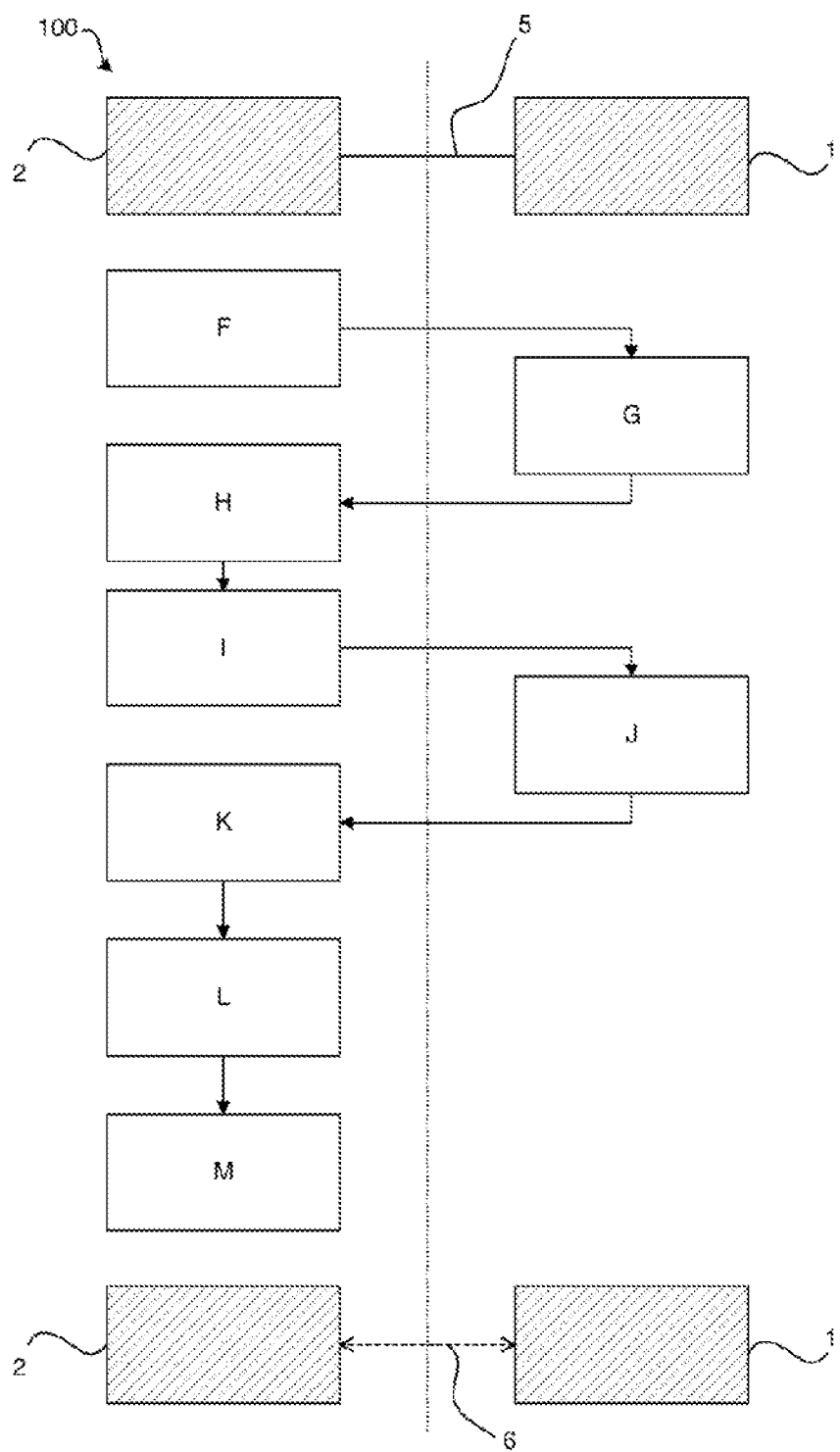
FIG. 3 shows a schematic illustration of a method described here according to a further exemplary embodiment.

FIG. 3 uses a flowchart to show a schematic illustration of a method for automatically configuring an external control system 2 for the open-loop and/or closed-loop control of a robot system 1 according to a further exemplary embodiment. In this case, an external control system 2 which has been provided is connected to a robot system 1 by means of a data connection 5 for the purpose of interchanging data. Furthermore, in a method step F, the external control system 2 retrieves basic information from the robot system 1. The communication between the external control system 2 and the robot system 1 can be effected, for example, using TCP/IP ("Transmission Control Protocol/Internet Protocol") or using NFC ("Near Field Communication"). In method step G, the basic information is provided by the robot system 1. The basic information may contain, for example, manufacturer details, for example a manufacturer name, possible integration levels to be selected, information relating to a bus configuration and/or visualization data. In method step H, a suitable integration level is selected by the external control system 2 and, in method step I, the external control system 2 retrieves the information required for configuration.

The integration levels to be selected may comprise, for example, the levels of "application", "interpolation" and/or "drive". The "application" level may comprise, for example, application commands (PTP, LIN), parameters and/or interface assignments (I/O). The "interpolation" level may comprise, for example, data relating to the manipulator 3, for example data relating to kinematics, axes, Denavit-Hartenberg (DH) parameters, masses, mass inertia, centers of gravity, jerking and/or torques. The "interpolation" level may also contain control information, for example with regard to interface assignment, signal sequence, cycle time, jitter, movement latency, set-up of the message protocol, path planning module and/or maximum accelerations. The "drive" level may comprise, for example, data relating to the manipulator 3, for example motor data, data relating to the static or dynamic friction and/or gear ratio of the manipulator. The "drive" level may also contain control information relating to an interface assignment.

In method step J, the retrieved data, which comprise, in particular, the interface and manipulator data, are provided by the robot system 1. In method step K, the data provided are then processed and checked by the external control system 2. In the subsequent method step L, the interface connection is automatically configured. In method step M, the mathematical robot model is created by means of the external control system 2 on the basis of the data provided by the robot system 1. Communication 6 is also set up between the external control system 2 and the robot controller 4 on the basis of the data. The communication 6 may be set up in a partially automated or fully automated manner, for example.

Figure 4:
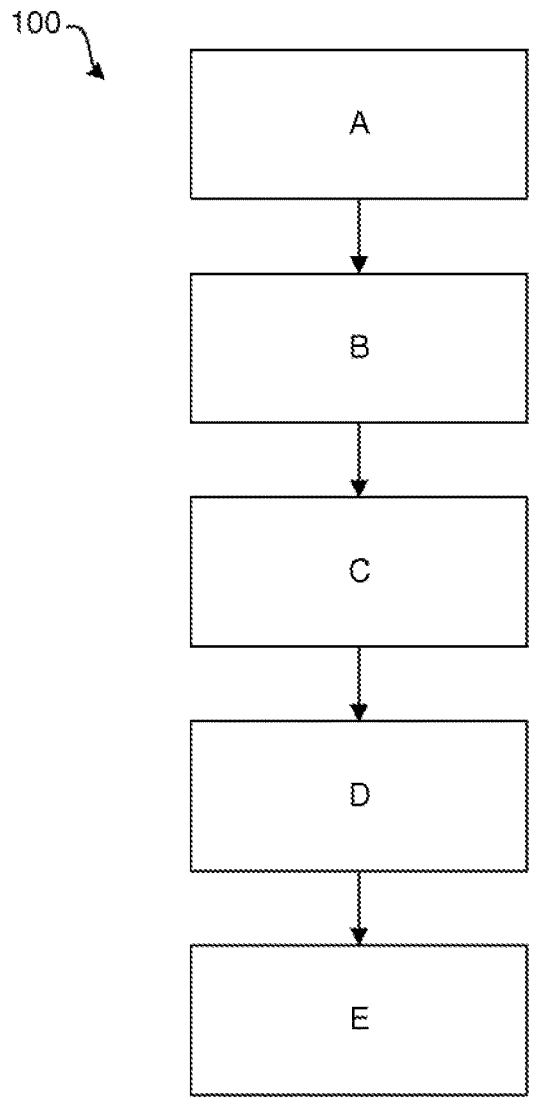
FIGS. 4 to 7 are schematic illustrations of a further method and systems for automatically configuring an external control system according to further exemplary embodiments.
Figure 5:
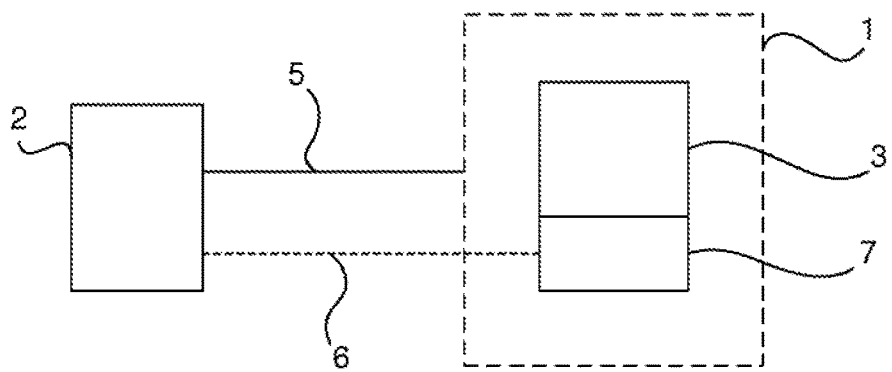

FIGS. 4 and 5 show two different schematic illustrations of a further method 100 for automatically configuring an external control system 2 for the open-loop and/or closed-loop control of a robot system 1 according to a first exemplary embodiment. In the method 100, an external control system 2 and a robot system 1, which comprises a manipulator 3 with a drive system 7, are first of all provided in a first method step A. The external control system 2 may have a robot controller or may consist of a further robot controller, for example. The external control system 2 may also have a computer and/or may comprise a distributed computer system, in particular a so-called cloud.

In a subsequent method step B, a connection 5 is set up between the robot system 1 and the external control system 2 for the purpose of interchanging data. The robot system 1 may have, for example, a control module (not shown) which may be part of the manipulator, for example, or may be fastened to the manipulator, the data being interchanged via the control module.

After the connection 5 has been set up, description data which comprise information relating to axis parameters of the manipulator 3 are transmitted from the robot system 1 to the external control system 2 in method step C. On the basis of the transmitted description data, it is possible for the external control system 2 to automatically carry out the interface configuration and to automatically set up a static and/or dynamic robot model in order to correctly control the manipulator 3.

The description data preferably contain data relating to lengths, distances and/or the rotational angle direction of the manipulator 3. The description data may also comprise data relating to Denavit-Hartenberg (DH) parameters, masses, mass inertia, centers of gravity, jerking, torques, motor data, static or dynamic friction and/or the gear ratio of the manipulator.

It is also possible for the description data to contain basic data relating to the robot system 1. In particular, the description data may contain information relating to the manufacturer of the robot system 1 and/or a visualization. The basic data relating to the robot system 1 may also contain, for example, information relating to the depth of integration of the robot system 1. The description data may also contain information for setting up a communicative and/or electrical connection 6 between the external control system 2 and the drive system 7 of the manipulator 3. For example, the description data may comprise information relating to the bus system, the encoder and/or the resolver.

In method step D, a mathematical robot model is created by way of the external control system 2 on the basis of the received description data. The mathematical robot model is preferably created by the external control system 2 in a partially automated or fully automated manner.

In method step E, a communicative and/or electrical connection 6 is set up between the external control system 2 and the drive system 7 of the manipulator 3 on the basis of the received description data. The communication 6 is preferably likewise set up in a partially automated or fully automated manner.

Figure 6:
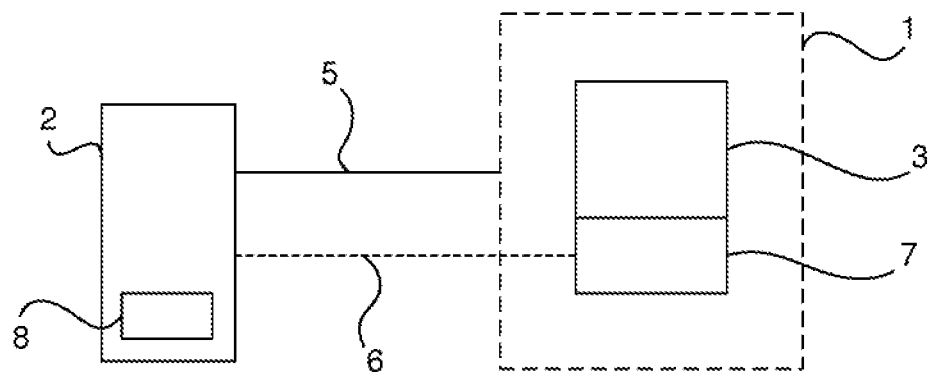
Figure 7:
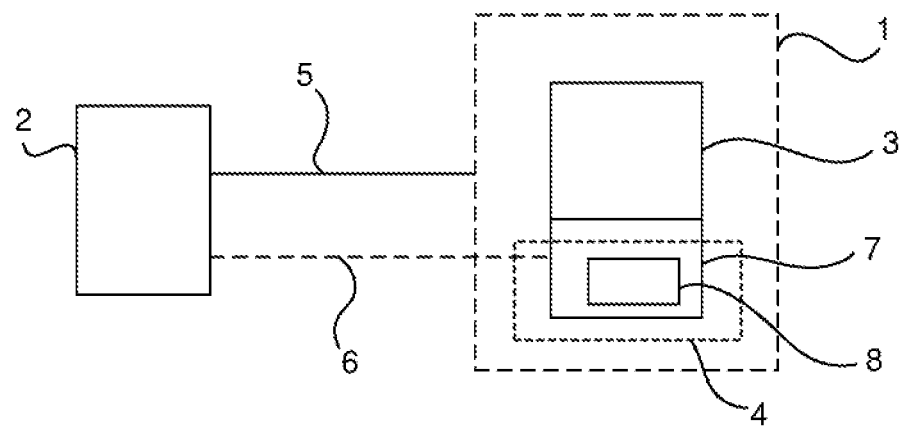

FIGS. 6 and 7 show two further exemplary embodiments of a further method described here. In contrast to the exemplary embodiment shown in connection with FIG. 5, the external control system 2, in the exemplary embodiment according to FIG. 6, has one or more frequency converters 8 which can be used to control a motor or a plurality of motors of the drive system 7 of the manipulator 3. The robot system 1 preferably does not have its own frequency converter.

In the exemplary embodiment according to FIG. 7, the drive system 7 of the manipulator 3 has one or more frequency converters 8 for controlling one or more motors of the drive system 7. The frequency converter(s) 8 is/are part of a robot controller 4 of the robot system 1. In this exemplary embodiment, it is not necessary for the external control system 2 to have frequency converters for the purpose of controlling motors of the manipulator 3.

The features described in the exemplary embodiments shown can also be combined with one another according to further exemplary embodiments. Alternatively or additionally, the exemplary embodiments shown in the figures may have further features according to the embodiments of the general description.

LIST OF REFERENCE SYMBOLS

1 Robot system
2 External control system
3 Manipulator
4 Robot controller
5 Connection
6 Communication
7 Drive system
8 Frequency converter
100 Method
A-M Method steps The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for automatically configuring an external control system, the method comprising the steps of:
   setting up a connection for interchanging data between a robot system and the external control system, the robot system having at least one manipulator and a robot controller;
   receiving description data from the robot system via the connection at the external control system;
   creating a mathematical robot model by the external control system on the basis of the received description data; and
   setting up communication between the external control system and the robot controller over a second connection different from the connection on the basis of the received description data.

2. The method as claimed in claim 1, wherein
the description data contains basic data relating to the robot system including data relating to a manufacturer and/or visualization.

3. The method as claimed in claim 2, wherein
the basic data contains information relating to a depth of integration of the robot system.

4. The method as claimed in claim 3, wherein
the description data contains data relating to the manipulator of the robot system.

5. The method as claimed in claim 1, wherein
the description data contains data relating to the manipulator of the robot system.

6. The method as claimed in claim 5, wherein
the data relating to the manipulator comprises information relating to one or more of the following features: kinematics, axes, Denavit-Hartenberg (DH) parameters, masses, mass inertia, centers of gravity, jerking, torques, motor data, static and/or dynamic fiction, and gear ratio.

7. The method as claimed in claim 1, wherein
the description data contains information for setting up the communication between the external control system and the robot controller.

8. The method as claimed in claim 7, wherein
the description data comprises information relating to one or more of the following features: interface assignment to a movement command specification, signal sequence, interface assignment to a position specification, cycle time, jitter, movement latency, and set-up of the message protocol.

9. The method as claimed in claim 1, wherein
the mathematical robot model is created by the external control system in a partially or fully automated manner.

10. The method as claimed in claim 1, wherein
the communication between the external control system and the robot controller is set up in a partially or fully automated manner.

11. The method as claimed in claim 1, wherein
the external control system includes a further robot controller.

12. The method as claimed in claim 1, wherein
the external control system includes a computer.

13. The method as claimed in claim 1, wherein
the external control system comprises a distributed computer system.

14. The method as claimed in claim 1, wherein
the description data is semantically described in order to enable automated processing.

15. The method as claimed in claim 1, wherein
the description data is described in a multi-stage model in order to differentiate control of the robot system between at least two of the following levels: application level, interpolation level, and drive level.

16. The method as claimed in claim 1, wherein
the description data are transmitted via a release mechanism.

17. The method as claimed in claim 16, wherein
the release mechanism is a license key.

18. The method as claimed in claim 1, wherein
the description data contains a path planning module and/or maximum acceleration values.

19. A method for automatically configuring an external control system, the method comprising the steps of:
   setting up a connection for interchanging data between a robot system and the external control system, the robot system having at least one manipulator and a robot controller;
   receiving description data from the robot system at the external control system;

creating a mathematical robot model by the external control system on the basis of the received description data;
setting up communication between the external control system and the robot controller on the basis of the received description data; and
directly supplying a voltage from the external control system to a drive system of the manipulator.

\* \* \* \* \*